US006192712B1

(12) United States Patent
Saito et al.

(10) Patent No.: US 6,192,712 B1
(45) Date of Patent: *Feb. 27, 2001

(54) OPTICAL WAVEGUIDE FABRICATION METHOD

(75) Inventors: Takashi Saito; Tadahiko Hanada, both of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/035,076

(22) Filed: Mar. 5, 1998

(30) Foreign Application Priority Data

Mar. 5, 1997 (JP) .................................. 9-050457

(51) Int. Cl.[7] .................................. C03B 37/022

(52) U.S. Cl. .................. 65/386; 65/392; 65/413; 65/425

(58) Field of Search ............ 65/386, 392, 413, 65/414, 415, 425; 385/130

(56) References Cited

U.S. PATENT DOCUMENTS

| | | | |
|---|---|---|---|
| 4,856,859 | * 8/1989 | Imoto | 385/129 |
| 4,946,251 | * 8/1990 | Ashwell et al. | 385/141 |
| 5,235,659 | * 8/1993 | Atkins et al. | 385/124 |
| 5,287,427 | * 2/1994 | Atkins et al. | 385/124 |
| 5,387,269 | * 2/1995 | Nijander et al. | 65/386 |
| 5,478,371 | * 12/1995 | Lamaire et al. | 65/384 |
| 5,495,548 | * 2/1996 | Bilodeau et al. | 385/123 |
| 5,500,031 | * 3/1996 | Atkins et al. | 65/386 |
| 5,506,925 | * 4/1996 | Greene et al. | 385/129 |
| 5,660,611 | * 8/1997 | Ishikawa et al. | 65/384 |
| 5,693,116 | * 12/1997 | Kanamori et al. | 65/384 |

FOREIGN PATENT DOCUMENTS

| | | |
|---|---|---|
| 4-298702 | 10/1992 | (JP) . |
| 6-160657 | 6/1994 | (JP) . |
| 8-248249 | 9/1996 | (JP) . |
| 8-334641 | 12/1996 | (JP) . |
| 9-269427 | 10/1997 | (JP) . |
| 97/23426 | * 7/1997 | (WO) . |

OTHER PUBLICATIONS

Bilodeau et al., "Photosensitization of optical fiber and silica–on–silica waveguides", Optics Letters, vol. 18, No. 12, 953–955 Jun. 1993.

Inai et al., "Fabrication of the fiber gratings with high reflectivity using hydrogenated fiber", Institute of Electronics, IEICE, C–208 (1994) (no month available).

Electronics Letters, vol. 30, No. 17, 1994, pp. 1401–1403 (No Month Avaiable).

Electronics Letters, vol. 32, No. 6, 1996, pp. 550–552 (No Month Available).

"FDM/WDM Couplers Using Silica Waveguide Deposited by APCVD"–IEICE Trans. Electron, vol. E80–C, No. 1, Jan. 1997, pp. 130–133.

"Integrated Cour–Channel Mach–Zehnder Multi/Demultiplexer Fabricated with Phosphorous Doped $SiO_2$ Waveguides on Si" –Lightwave Technology, vol. 6, No. 6, 1988, pp. 1011–1015 (No Month Available).

* cited by examiner

Primary Examiner—Sean Vincent
(74) Attorney, Agent, or Firm—Foley & Lardner

(57) ABSTRACT

A method for fabricating an optical waveguide, comprising the following steps. That is, forming an optical waveguide on surface of a substrate via an atmospheric pressure chemical vapor deposition (AP-CVD) method using a silica raw material containing an organic material, and irradiating ultraviolet light on at least a portion of that optical waveguide. The refractive index of the portion of the optical waveguide irradiated with ultraviolet light increases. Since changing the refractive index in this way enables the formation of a diffraction grating, it is possible to manufacture optical filters and wavelength dispersion devices.

20 Claims, 6 Drawing Sheets

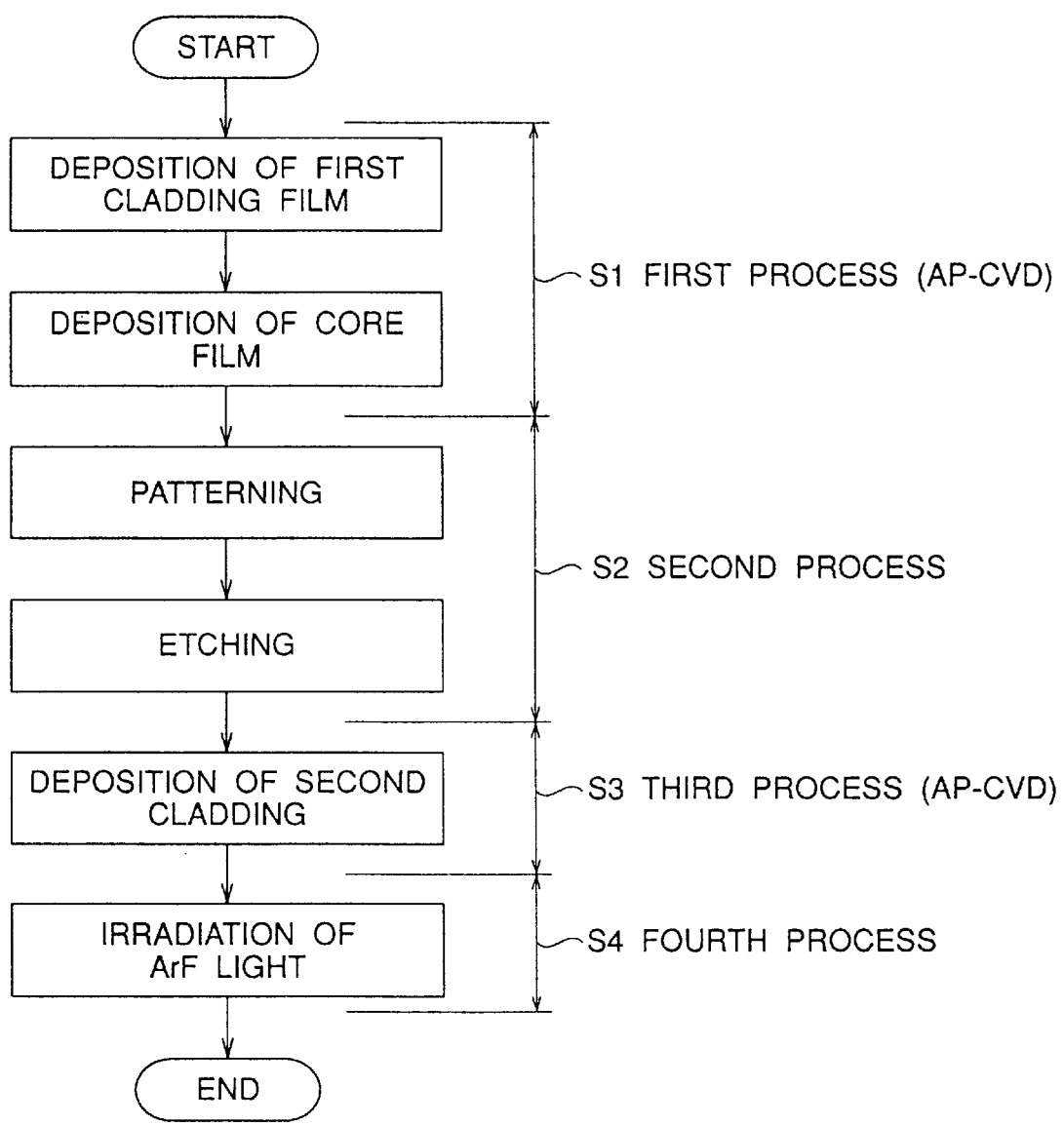
F I G. 1

OPTICAL WAVEGUIDE FABRICATION METHOD

BACKGROUND OF THE INVENTION

1. Field of the Invention

The present invention relates to an optical waveguide fabrication method, which utilizes a phenomenon, whereby the irradiation of an ultraviolet light onto an optical waveguide changes the refractive index of this optical waveguide (hereafter referred to as "photo-induced refractive-index change").

2. Description of the Related Art

Over the years, various methods have been proposed for fabricating optical waveguides. In particular, there is a method for adjusting the refractive index of an optical waveguide, which calls for irradiating a portion of the optical waveguide with ultraviolet light. More specifically, there is a difference in the refractive index of an optical waveguide comprising a germanium (Ge)-doped silica material after it has been irradiated with ultraviolet energy. This is called a photo-induced refractive-index change. This kind of photo-induced refractive-index change phenomenon can be used to readily form a diffraction grating inside an optical waveguide by simply irradiating the optical waveguide with the appropriate ultraviolet energy. For this reason, the above-described method is being practiced in a variety of fields, such as the fabrication of optical filters and wavelength dispersion devices.

A simple explanation of the change in refractive index of an optical waveguide resulting from the irradiation of ultraviolet light is given here. Ultraviolet irradiation of an optical waveguide comprised of a silica material that had not been doped in any way only resulted in a refractive index change of about 0.0001. To fabricate a Bragg diffraction grating with a reflectivity of 99.9% using this optical waveguide required more than 20 mm of the length of the optical waveguide in the direction of the optical axis. Consequently, miniaturization was not possible when manufacturing optical devices containing this optical waveguide. To achieve miniaturization of the optical waveguide, a change of over 0.001 in the refractive index is desired.

Well-known methods for maximizing the change in refractive index of an optical waveguide include high-pressure hydrogen loading (treatment) and a reduction treatment that uses a flame-brush. The high-pressure hydrogen loading is a method, whereby an optical waveguide is maintained for several weeks in a high-pressure hydrogen environment pressurized to over 100 atmospheres, thereby allowing hydrogen to diffuse into the silica material comprising the optical waveguide.

An explanation of the fabrication of a high-reflectivity fiber grating using an optical fiber subjected to a high-pressure hydrogen loading (treatment) is given here. This is described in detail in a paper by Ms. Inai et al (Fall Conference of the Institute of Electronics, Information and Communications Engineers (IEICE), C-208 (1994)). Inai et al conducted an experiment, wherein an optical fiber serving as an optical waveguide was maintained in a 200-atmosphere hydrogen environment at room temperature for 168 hours. This enhanced the sensitivity of the waveguide to ultraviolet light, making it possible to achieve a refractive-index change of around 0.002 via ultraviolet irradiation.

With regard to increasing the refractive index using a flame-brush treatment, Mr. F. Bilodeau et al described this process in detail in "Photosensitization of optical fiber and silicaon-silicon/silica waveguides" (OPTICS LETTERS, Vol. 18, No. 12, P953-P955, Jun. 15, 1993).

The flame-brush treatment is explained using the attached figures. FIG. 7 is a sectional view depicting the general structure of an optical waveguide 30. As shown in FIG. 7, the optical waveguide 30, which comprises a silica material formed on a surface of a substrate 31, is comprised of three parts: a first cladding 33, a core 32 and a second cladding 34. FIG. 8 is a schematic depicting the processes in a conventional optical waveguide fabrication method, which utilizes a flame-brush treatment. The conventional method of fabricating an optical waveguide 30 via a reduction treatment that makes use of a flame comprises a first process (Step S35), whereby a first cladding 33 and core 32 are formed on a substrate 31; a second process (Step S36) for forming an optical waveguide 30 pattern (the part that becomes the core); a third process (Step S37) for forming a second cladding 34; and a fourth process (Step S38) for carrying out a flame-brush treatment and irradiating the optical waveguide with a 248 nm-wavelength krypton-fluoride (KrF) excimer laser to change the refractive index of a portion of the core 32.

In the conventional fabrication method described above, a flame hydrolysis deposition method is used to form the claddings 33, 34 and core 32 in the first process (Step S35) and the third process (Step S37). Flame hydrolysis deposition is a method, whereby a silica powder containing a small amount of Ge is deposited on surface of the substrate 31, after which a flame with a temperature of around 1,500° C. is applied to the silica powder. This flame-based heat treatment causes the silica to melt and become transparent, thus forming the film which becomes the claddings 33, 34 and core 32.

FIG. 9 illustrates the flame-brush treatment process within the fourth process (Step S38). This reduction treatment is a method, whereby a portion of the core 32 is brushed (heated) repeatedly for approximately 20 minutes by a roughly 1,700° C. flame 39 fueled by hydrogen ($H_2$) containing a slight amount of oxygen ($O_2$). This reduction treatment heightens sensitivity to ultraviolet light. The flame 39 is provided by way of burner 40. An optical waveguide subjected to a flame-brush treatment can achieve a refractive index change of more than 0.001 upon irradiation with KrF energy.

Fabricating a silica optical waveguide using a high-pressure hydrogen treatment or flame-brush treatment as described above increases the photo-induced refractive-index change. However, the above-described conventional methods posed the following problems. That is, in a silica optical waveguide fabrication method which uses the high-pressure hydrogen treatment, because the hydrogen is under 100 atmospheres or more of pressure, caution is required during operation. Also, as described above, since it is necessary to maintain an optical waveguide in a high-pressure hydrogen environment for a long period of time (for 168 hours in the example given above), this approach makes it impossible to enhance fabrication efficiency.

When it comes to a silica optical waveguide fabrication method which uses the flame-brush treatment, as described above, a heat treatment with a flame temperature of around 1,700° C. is applied to a portion of a substrate. Consequently, when silicon (Si) is used as the substrate 31 material, heating generates considerable heat deformation in the substrate, which in turn can cause cracks in the silica cladding layers and make the core susceptible to birefringence.

SUMMARY OF THE INVENTION

An object of the present invention is to provide a method for fabricating a silica optical waveguide using photo-induced refractive-index change.

To overcome the above-described problems, the optical waveguide fabrication method of the present invention adopts means such as the following. That is, this method for fabricating an optical waveguide comprising a silica material is characterized in that a raw material containing an organic material is used, and after a silica optical waveguide film is formed on a substrate via atmospheric pressure chemical vapor deposition (AP-CVD), an ultraviolet light is irradiated on at least a portion of this optical waveguide film. The refractive index of that portion irradiated with this ultraviolet light changes.

In accordance with the present invention, an optical waveguide can be made under atmosphere pressure and without excessively high temperature processing, thus facilitating fabrication control. It also eliminates the problem of cladding and core deformation resulting from heating.

Furthermore, using the optical waveguide fabrication method of the present invention also makes it possible to manufacture a Mach-Zehnder interferometer. This is because irradiating ultraviolet light on a portion of the optical waveguide enables the refractive index of that part to be changed.

BRIEF DESCRIPTION OF THE DRAWINGS

FIG. 1 depicts the flow of the optical waveguide fabrication method of the present invention;

DESCRIPTION OF THE PREFERRED EMBODIMENTS

Figure 2:
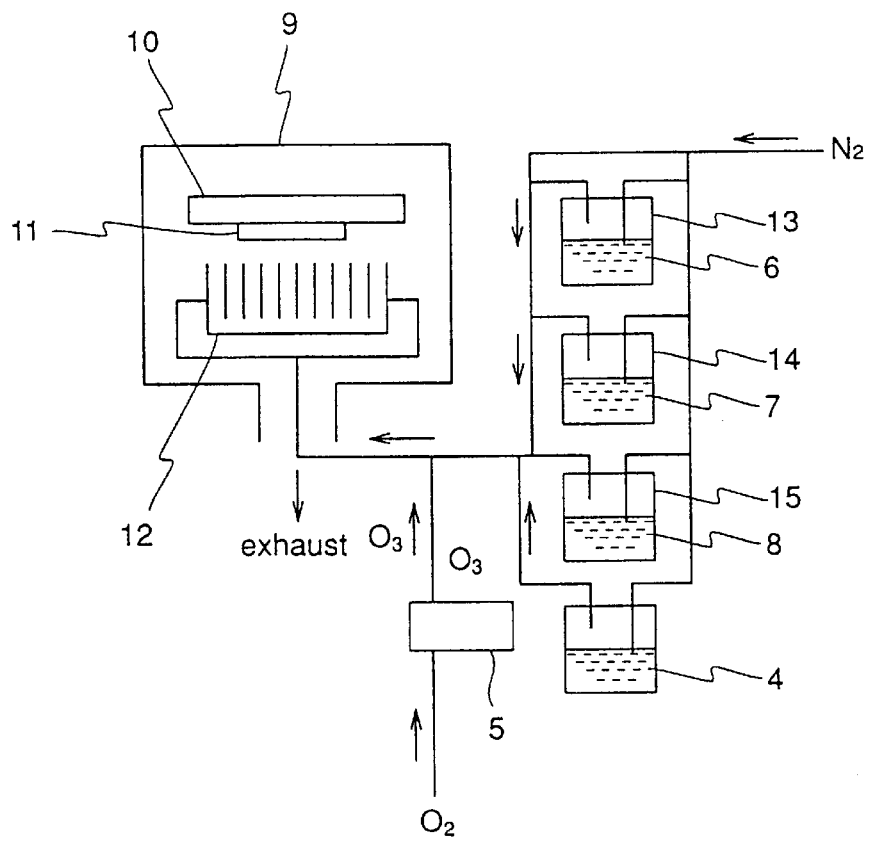
FIG. 2 is a schematic illustrating the method for growing silica film in the optical waveguide fabrication method of the present invention.

Silicon and silica are used as the materials for the substrate in which the optical waveguide is configured in the present invention. Specifically, the following materials are used in the configuration of the optical waveguide. For example, when $SiO_2+P_2O_5$ are used as the materials for the first and second claddings, simultaneously, $SiO_2+P_2O_5+GeO_2$ are used as the core materials. Another possible combination uses $SiO_2+P_2O_5+B_2O_3$ as the cladding materials, together with $SiO_2+P_2O_5+GeO_2$ as the core materials.

Here $P_2O_5$ is doped into the first cladding, second cladding and core, respectively, at a concentration of more than 3 mol % relative to the $SiO_2$. There is no particular upper limit on the concentration of $P_2O_5$, but because the melting point of $P_2O_5$ is roughly 580° C., problems occur when this concentration is increased unnecessarily. Consequently, when annealing is to be done at between 600–800° C., for instance, setting the $P_2O_5$ concentration at less than 20 mol % relative to the $SiO_2$ is desirable, and setting this concentration at less than 10 mol % is even more desirable.

As explained above, a $P_2O_5$-doped optical waveguide possesses substantial absorption relative to light with wavelengths in the ultraviolet region. This makes it possible to change the refractive index of the portion of the optical waveguide which was irradiated with ultraviolet light. Therefore, it is desirable that the wavelength of the ultraviolet light to be irradiated be included in the absorption band of the optical waveguide. Whereas the absorption coefficient of the core of the optical waveguide of the present invention is less than 20/cm for ultraviolet light with a wavelength of 250 nm, for ultraviolet light with a wavelength of under 200 nm, it is over 100/cm. Therefore, it is desirable that the wavelength of the irradiated ultraviolet light be less than 200 nm.

The silica optical waveguide of the present invention was formed on a substrate using AP-CVD, which used a raw material that contained an organic material.

The organic material used in fabricating an optical waveguide can be an organic material that contains a silicon-based organic compound, a phosphorous-based organic compound, a germanium-based organic compound or a boron-based organic compound.

Specific examples of silicon-based organic compounds capable of being used include tetraethoxysilane and tetramethylorthosilicate. And specific examples of phosphorous-based organic compounds capable of being used include tri-ethylphosphate and tri-methylphosphate. And a specific example of a germanium-based organic compound capable of being is tetramethoxygermanium. Finally, specific examples of boron-based organic compounds capable of being used include tri-ethylborate and tri-methylborate.

In accordance with the film formation method for the optical waveguide of the present invention, a film more than 10 $\mu$m thick can be formed at low temperatures ranging from 200° C. to 500° C. Also, the ultraviolet light source used in photo-induced refractive-index change in the optical waveguide fabrication method of the present invention uses a pulsed laser, which generates light at a wavelength of less than 200 nm. Further, this pulsed laser operates at a repetition frequency of less than 50 pulses per second. This ultraviolet irradiation is designed to change the refractive index of the optical waveguide. The type of laser used is an argon fluoride (ArF) excimer laser 21. Using this kind of pulsed laser light source makes it possible to achieve a large change in the refractive index.

The optical waveguide fabrication method of the present invention can also be applied to a fabrication method for a Mach-Zehnder interferometer. That is, a portion of one of the two optical waveguides comprising a Mach-Zehnder interferometer is irradiated with ultraviolet light. This makes it possible to freely set the wavelength of the interfering light when it is reunited after passing through the two optical waveguides, and enables the manufacture of a Mach-Zehnder interferometer. Next, a detailed explanation of a specific example of the optical waveguide fabrication method of the present invention is given based on FIG. 1.

The optical waveguide fabrication method of the present invention comprises a first process (Step S1), whereby AP-CVD is used to form a first cladding 33 film and a core 32 film; a second process (Step S2) comprised of patterning and etching procedures for forming an optical waveguide pattern; a third process (Step S3) for forming a second cladding 34 using AP-CVD; and a fourth process (Step S4) for changing the refractive index of a portion of the core by irradiating it with an ArF pulsed laser beam having a wavelength of 193 nm.

For the present invention, the deposition of the films for the cladding and core in the first process (Step S1) and the third process (Step S3) is carried out at a low temperature ranging between roughly 300° C. and 500° C. Following the deposition of each film, annealing is performed at between 600° C. and 800° C. to remove the moisture from inside the respective films.

A detailed explanation with reference to the figures is given on the first process (Step S1) and the third process (Step S3) in the optical waveguide fabrication method of the present invention described above. FIG. 2 provides a schematic illustrating the AP-CVD method of the present invention, whereby the core and claddings are formed, and depicts a case wherein $GeO_2$ and $P_2O_5$ are doped into $SiO_2$. The equipment utilized in the fabrication of the optical waveguide of the present invention comprise a heater 10, which heats up an Si substrate 11, and an ozonizer 5 for generating ozone. The heater 11 is disposed in an atmospheric reaction chamber 9. This equipment is also equipped with an Si container 13, in which the $SiO_2$, the raw material for the core and claddings, is stored, and a P container 14 and a Ge container 15 for storing the substances to be doped. A container for storing $P_2O_5$ is also provided.

Si-based organic materials 6, such as tetraethoxysilane ($Si(OC_2H_5)_4$) and tetramethylorthosilicate are stored in the above-mentioned Si container 13. And P-based organic materials 7, such as tri-methylphosphate ($PO(OCH_3)_3$) and tri-ethylphosphate ($PO(OC_2H_6)_3$) are stored in the P container 14. In addition, Ge-based organic materials 8, such as tetramethoxygermanium ($Ge(OCH_3)_4$) are stored in the Ge container 15. The Si-based organic materials 6, P-based organic materials 7, and Ge-based organic materials 8 each flow parallel to a stream of nitrogen ($N_2$), and are lead, together with ozone generated by the ozonizer 5, to the heated substrate 11 via a dispersion head 12.

The Si-based organic materials 6, P-based organic materials 7, Ge-based organic materials 8 and ozone guided to the surface of the substrate 11 react chemically, forming on surface of the substrate 11 a $P_2O_5$, $GeO_2$-doped silica film.

The concentration of the $P_2O_5$, $GeO_2$ can be adjusted by changing the flow of the $N_2$ flowing through the respective containers 13, 14, 15. The concentration of $P_2O_5$ is set, for example, at between 3–5 mol % relative to the $SiO_2$ to be deposited. Furthermore, when doping with boron oxide ($B_2O_3$), a boron-based organic material, such as tri-ethylborate ($B(OC_2H_5)_3$) or tri-methylborate ($B(OCH_3)_3$) can be used instead of a Ge-based organic material 8.

Figure 3:
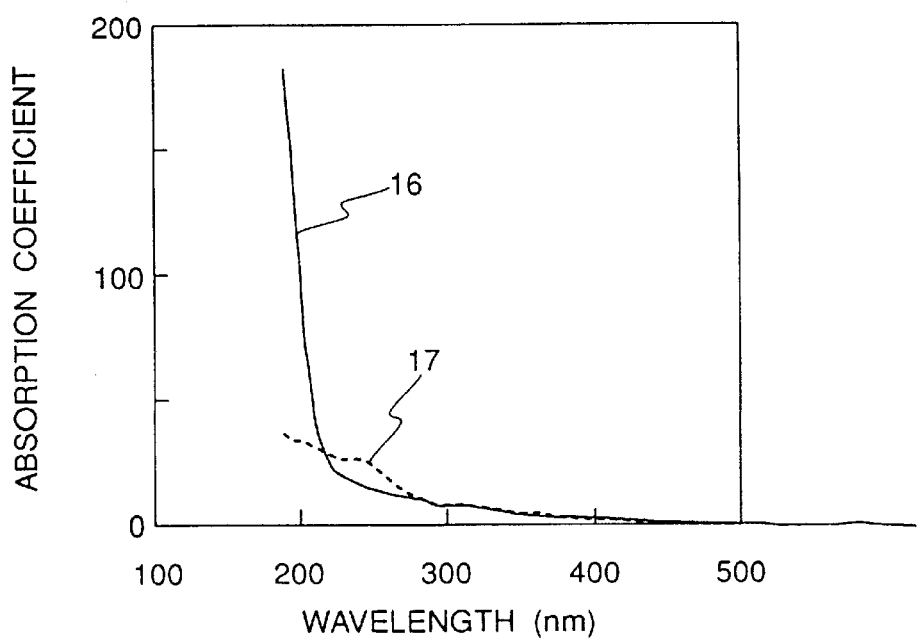
FIG. 3 depicts the absorption coefficients of films grown using the silica film growing method used in the optical waveguide fabrication method of the present invention.

The film-growing method of the present invention makes it possible to grow films at low temperatures of under 500° C., thus enabling the formation of an optical waveguide that exhibits little deformation in the film and substrate 11, and little birefringence. Furthermore, doping $P_2O_5$ in concentrations greater than 3 mol % creates oxygen vacancy-type structural defects, the effects of which greatly increase the absorption coefficient relative to ultraviolet light with a wavelength under 200 nm in the vacuum ultraviolet wavelength region. FIG. 3 compares the absorption coefficient relative to ultraviolet light 16 for an optical waveguide that has been doped with $P_2O_5$ with the absorption coefficient 17 for one that has not been doped with $P_2O_5$. $P_2O_5$ doping lowers the absorption coefficient for ultraviolet light with a wavelength in the vicinity of 250 nm, but greatly increases the absorption coefficient in the under 200 nm wavelength region.

Figure 4:
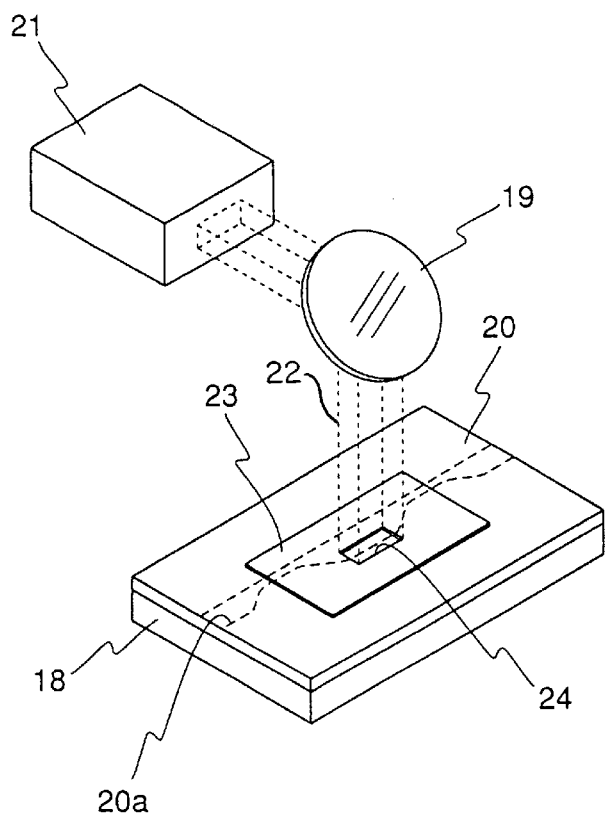
FIG. 4 is a schematic illustrating the light irradiation method used in the optical waveguide fabrication method of the present invention.

The following explanation uses the figures as reference to describe the fourth process S4 (See FIG. 1) of the optical waveguide fabrication method of the present invention. FIG. 4 depicts a device for irradiating ArF energy 22, which is ultraviolet light, to bring about a change in the refractive index of a Mach-Zehnder frequency division multiplex coupler 18 with a center wavelength of 1.55 μm and a free spectral range of 1.8 nm manufactured using the first process (Step S1), the second process (Step S2) and the third process (Step S3) described above. ArF energy 22 is irradiated onto one part of the optical waveguide 20a of the core 20 of the MZ FDM coupler 18 shown in FIG. 4 through a prescribed opening 24 formed in a mask 23. The length of the irradiated part, which parallels the optical axis of the optical waveguide 20a, is roughly 0.5 mm. In FIG. 4, ArF excimer laser 21 outputs ArF energy to a mirror 9, which directs the ArF energy 22 to the prescribed opening 24 formed in the mask 23.

Figure 5:
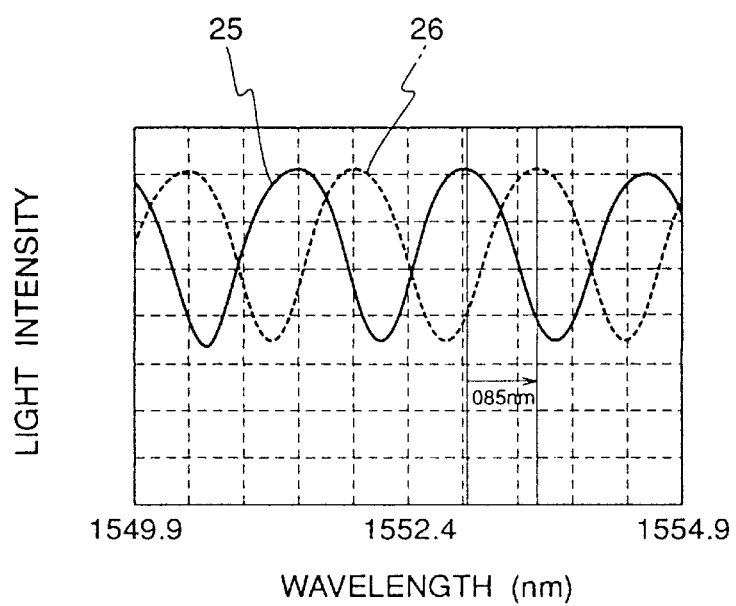
FIG. 5 depicts the characteristics of a Mach-Zehnder (MZ) frequency-division multiplex (FDM) coupler manufactured using the optical waveguide fabrication method of the present invention.

FIG. 5 compares the output energy of the optical waveguide prior to and after it has been irradiated with ArF light 22. Specifically, this figure depicts the results of measurements of the wavelength characteristics of cross port output energy resulting from 1.55 μm-band light incident upon the optical waveguide. As depicted in FIG. 5, the wavelength shifts roughly 0.58 nm from the light output 25 from the optical waveguide 20a prior to its being irradiated with ArF light 22, to the light output 26 from the optical waveguide 20a after it has been irradiated with ArF light 22. When this shift is converted to a refractive index change, the index increases roughly 0.001.

Further, in accordance with the present invention, photo-induced refractive-index change with extremely small birefringence is possible. A Bragg diffraction grating, for which the refractive index of the optical waveguide has been changed to around 0.001, is capable of achieving 99.9% reflectivity at a length of roughly 2 mm. Consequently, using the method of the present invention enables the manufacture of devices that utilize small optical waveguides, which are more than capable of being practiced.

Figure 6:
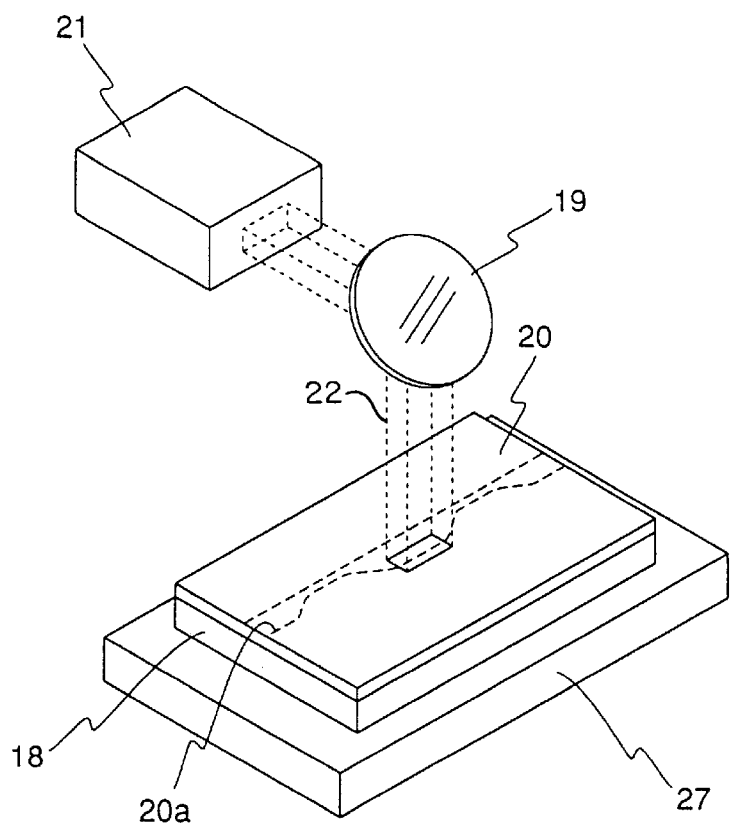
FIG. 6 is a schematic illustrating another method of ultraviolet light irradiation used in the optical waveguide fabrication method of the present invention.
Figure 7:
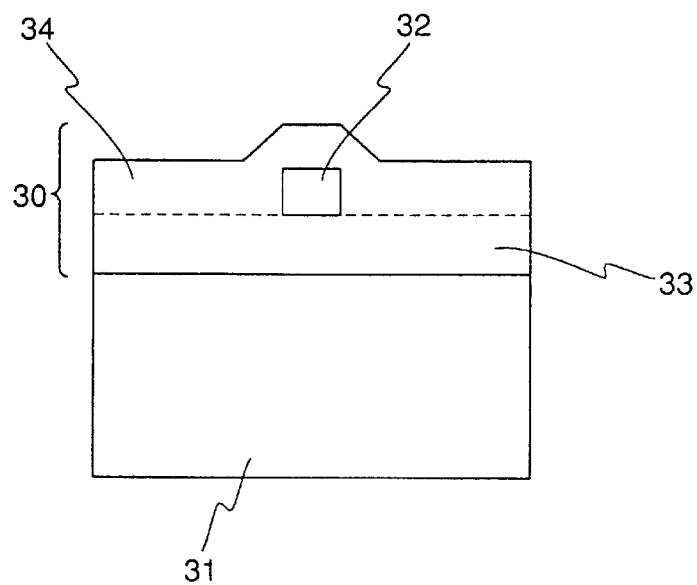
FIG. 7 depicts the basic structure of an optical waveguide.
Figure 8:
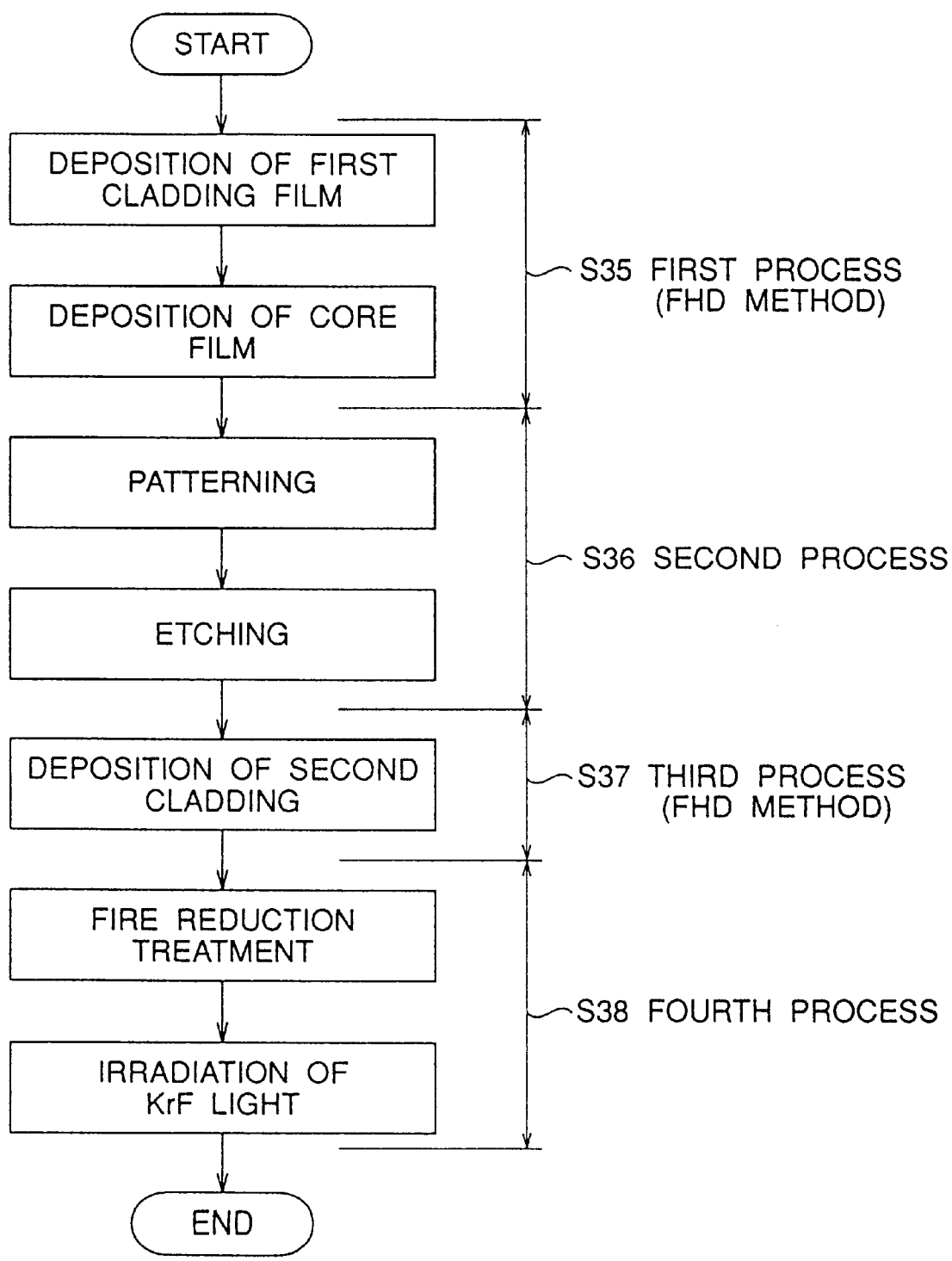
FIG. 8 is a schematic illustrating the flow of a conventional optical waveguide fabrication method.
Figure 9:
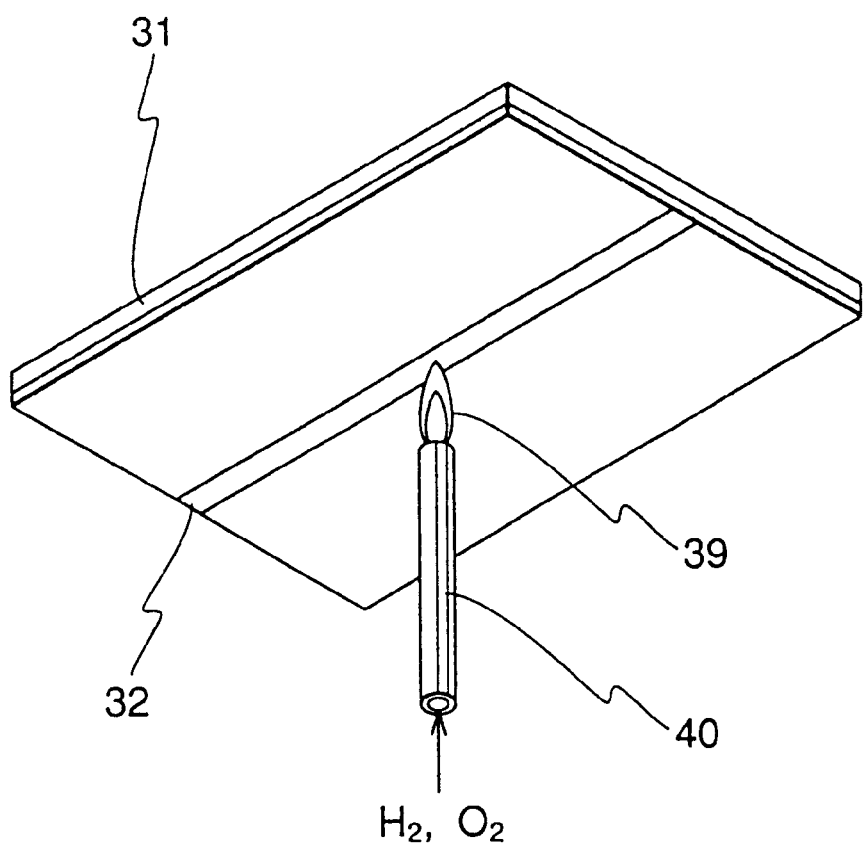
FIG. 9 depicts a flame-brush treatment used in a conventional optical waveguide fabrication method.

FIG. 6 illustrates another irradiation method when irradiating ultraviolet light 22 onto an optical waveguide 20a in the optical waveguide fabrication method of the present invention. Similar to FIG. 4, ArF excimer laser 21 outputs ArF energy to a mirror 9, which directs the ArF energy 22 to the optical waveguide 20a. As shown in FIG. 6, an MZ FDM coupler 18 is held on top of a moving stage 27. This embodiment is configured so that moving the moving stage 27 allows the entire core 20 of the MZ FDM coupler 18 to be irradiated with ultraviolet light 22. The method of fabricating an optical waveguide 20a in accordance with the present invention is characterized in that the use of low temperature processes, as described above, suppresses the occurrence of heat deformation, and keeps birefringence low. However, as a result of the difference in expansion coefficients between the MZ FDM coupler 18 and the core 20, stress occurs between the MZ FDM coupler 18 and the core 20, giving rise to slight birefringence in the optical waveguide. Relative to this, the irradiation of ArF light over the entire core in this embodiment increases the refractive index. In other words, core 20 density increases.

Consequently, the stress occurring between the MZ FDM coupler 18 and the core 20 is canceled. It becomes possible to improve birefringence as a result.

As explained above, in accordance with the present invention, because the film for the optical waveguide layer can be formed at low temperatures, fabrication control is simplified, and the problem of core and cladding deformation can be eliminated. Also, doping the optical waveguide layer with phosphorous oxide enables the formation of a large absorption band relative to ultraviolet light with wavelengths under 200 nm, and irradiation of a 200 nm-wavelength pulsed laser makes it possible to achieve a large refractive index change.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-050457 (Filed on Mar. 5th, 1997) including specification, claims, drawings and summary, are incorporated herein by reference in its entirety.

What is claimed is:

1. A method for fabricating an optical waveguide, comprising the steps of:
   a) forming an optical waveguide on the surface of a substrate via an atmospheric pressure chemical vapor deposition method using a silica raw material containing an organic material; and
   b) irradiating ultraviolet light on at least a portion of the optical waveguide, wherein the organic material is formed from a combination of a silicon-based organic compound, a phosphorous-based organic compound, and a germanium-based organic compound, and
      wherein the step of forming the optical waveguide comprises the following substeps:
      a1) forming a first cladding layer and a core layer using the atmospheric pressure chemical vapor deposition method;
      a2) annealing the first cladding layer and the core layer at a temperature of between 600° C. and 800° C. to remove moisture therein; and
      a3) forming a second cladding layer directly on the first cladding layer using the atmospheric pressure chemical vapor deposition method,
         wherein the irradiating step results in the irradiated portion of the optical waveguide having a different refractive index as compared to a non-radiated portion of the optical waveguide,
         wherein the ultraviolet light is provided as a series of pulsed light beams onto the portion of the optical waveguide during the irradiating step.

2. The optical waveguide fabrication method according to claim 1, wherein the silicon-based organic compound is either tetraethoxysilane or tetramethylorthosilicate.

3. The optical waveguide fabrication method according to claim 1, wherein the phosphorous-based organic compound is either tri-methylphosphate or tri-ethylphosphate.

4. The optical waveguide fabrication method of claim 1, wherein the germanium-based organic compound is tetramethoxygermanium.

5. The optical waveguide fabrication method according to claim 1, wherein a light source, which irradiates the ultraviolet light on the optical waveguide, generates a pulse-shaped laser beam with a wavelength of less than 200 nm.

6. The optical waveguide fabrication method according to claim 1, wherein a light source, which irradiates the ultraviolet light on the optical waveguide, is an argon fluoride excimer laser that generates a 50 Hz or less pulsed laser.

7. The optical waveguide fabrication method according to claim 1, wherein the first and second cladding layers are formed of $SiO_2$ and $P_2O_5$, and the core layer is formed of $SiO_2$ and $P_2O_5$ and $GeO_2$, and
   wherein the core layer is formed by the following substeps:
   (a) flowing a silicon-based organic material along a first flow path;
   (b) flowing a phosphorous-based organic material along the first flow path;2
   (c) flowing a germanium-based organic material along the first flow path;
   (d) flowing a nitrogen gas along a second flow path parallel to the first flow path;
   (e) combining the first and second flow paths together with ozone provided along a third path; and
   (f) providing an output of the combined first, second and third flow paths along a fourth path to the surface of the substrate so as to form the core layer,
      wherein only materials flowing along the fourth path are utilized to form the core layer.

8. The optical waveguide fabrication method according to claim 1, wherein the first and second cladding layers are formed of $SiO_2$ and $P_2O_5$ and $B_2O_3$, and the core layer is formed of $SiO_2$ and $P_2O_5$ and $GeO_2$.

9. The optical waveguide fabrication method according to claim 7, wherein a concentration of the $P_2O_5$ is set at less than 20 mol % relative to a concentration of the $SiO_2$.

10. The optical waveguide fabrication method according to claim 1, wherein the step of forming the first cladding layer and the step of forming the second cladding layer are each performed at a temperature of between 300° C. and 500° C.

11. The optical waveguide fabrication method according to claim 1, wherein the step of forming the optical waveguide further comprises the step of:
   a4) annealing the second cladding layer at a temperature of between 600° C. and 800° C. to remove moisture therein.

12. A method for fabricating an optical waveguide, comprising the steps of:
   a) forming an optical waveguide on the surface of a substrate via an atmospheric pressure chemical vapor deposition method using a silica raw material containing an organic material; and
   b) irradiating ultraviolet light on at least a portion of the optical waveguide,
      wherein the organic material is formed from a combination of a silicon-based organic compound, a phosphorous-based organic compound, and a boron-based organic compound, and
      wherein the step of forming the optical waveguide comprises the following substeps:
      a1) forming a first cladding layer and a core layer using the atmospheric pressure chemical vapor deposition method;
      a2) annealing the first cladding layer and the core layer at a temperature of between 600° C. and 800° C. to remove moisture therein; and a3) forming a second cladding layer directly on the first cladding layer using the atmospheric pressure chemical vapor deposition method,
    wherein the irradiating step results in the irradiated portion of the optical waveguide having a different refractive index as compared to a non-radiated portion of the optical waveguide,
    wherein the ultraviolet light is provided as a series of pulsed light beams onto the portion of the optical waveguide during the irradiating step.

13. The optical waveguide fabrication method according claim 12, wherein the silicon-based organic compound is either tetraethoxysilane or tetramethylorthosilicate.

14. The optical waveguide fabrication method according to claim 12, wherein the phosphorous-based organic compound is either tri-methylphosphate or tri-ethylphosphate.

15. The optical waveguide fabrication method according to claim 12, wherein the boron-based organic compound is either tri-methylborate or tri-ethylborate.

16. The optical waveguide fabrication method according to claim 12, wherein the first and second cladding layers are formed of $SiO_2$ and $P_2O_5$, and the core layer is formed of $SiO_2$ and $P_2O_5$ and $GeO_2$.

17. The optical waveguide fabrication method according to claim 12, wherein the first and second cladding layers are formed of $SiO_2$ and $P_2O_5$ and $B_2O_3$, and the core layer is formed of $SiO_2$ and $P_2O_5$ and $GeO_2$.

18. The optical waveguide fabrication method according to claim 16, wherein a concentration of the $P_2O_5$ is set at less than 20 mol % relative to a concentration of the $SiO_2$.

19. The optical waveguide fabrication method according to claim 12, wherein the step of forming the first cladding layer and the step of forming the second cladding layer are each performed at a temperature of between 300° C. and 500° C.

20. The optical waveguide fabrication method according to claim 12, wherein the step of forming the optical waveguide further comprises the step of:
    a4) annealing the second cladding layer at a temperature of between 600° C. and 800° C. to remove moisture therein.

* * * * *